United States Patent
Kwon et al.

(10) Patent No.: US 11,374,274 B2
(45) Date of Patent: Jun. 28, 2022

(54) MIXED CONDUCTOR, ELECTROCHEMICAL DEVICE INCLUDING THE SAME, AND PREPARATION METHOD OF MIXED CONDUCTOR

(71) Applicant: Samsung Electronics Co., Ltd., Suwon-si (KR)

(72) Inventors: Hyukjae Kwon, Suwon-si (KR); Sangbok Ma, Suwon-si (KR); Hyunpyo Lee, Seoul (KR); Donghwa Seo, Burlington (KR); Dongmin Im, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 371 days.

(21) Appl. No.: 16/592,843

(22) Filed: Oct. 4, 2019

(65) Prior Publication Data

US 2020/0136217 A1    Apr. 30, 2020

Related U.S. Application Data

(60) Provisional application No. 62/749,862, filed on Oct. 24, 2018.

(30) Foreign Application Priority Data

Nov. 2, 2018 (KR) .................. 10-2018-0133894

(51) Int. Cl.
*H01M 4/02* (2006.01)
*H01M 12/02* (2006.01)
(Continued)

(52) U.S. Cl.
CPC ........ *H01M 12/02* (2013.01); *C01G 45/1264* (2013.01); *C01G 51/70* (2013.01); *C01G 55/002* (2013.01); *G02F 1/1524* (2019.01); *H01G 11/62* (2013.01); *C01P 2002/34* (2013.01); *C01P 2002/72* (2013.01); *C01P 2006/40* (2013.01); *H01G 11/06* (2013.01); *H01M 2300/0071* (2013.01)

(58) Field of Classification Search
CPC ....................................................... H01M 4/02
See application file for complete search history.

(56) References Cited

FOREIGN PATENT DOCUMENTS

| EP | 3659972 A2 | 6/2020 |
|---|---|---|
| JP | 2010-123265 | * 6/2010 |
| KR | 1020140011752 A | 1/2014 |

OTHER PUBLICATIONS

Khalesi (Production of Syngas by CO2 Reforming on MxLa1-xNi0.3Al0.7O3-d (M = Li, Na, K) Catalysts, Ind. Eng. Chem. Res. 2008, 47, 5892-5898).*

(Continued)

*Primary Examiner* — Jacob B Marks
(74) *Attorney, Agent, or Firm* — Cantor Colburn LLP

(57) ABSTRACT

A mixed ionic and electronic conductor represented by Formula 1:

$$T_xVa_yA_{1-x-y}M_zO_{3-\delta},$$

wherein T includes at least one monovalent cation, A includes at least one of a monovalent cation, a divalent cation, and a trivalent cation, M includes at least one of a trivalent cation, a tetravalent cation, and a pentavalent cation, M is an element other than Ti and Zr, Va is a vacancy, $\delta$ is an oxygen vacancy, $0<x$, $y\leq0.25$, $0<z<1$, and $0\leq\delta\leq1$.

19 Claims, 5 Drawing Sheets

(51) Int. Cl.
  *G02F 1/1524* (2019.01)
  *C01G 45/12* (2006.01)
  *C01G 51/00* (2006.01)
  *C01G 55/00* (2006.01)
  *H01G 11/62* (2013.01)
  *H01G 11/06* (2013.01)

(56) References Cited

OTHER PUBLICATIONS

Brant et al., "Rapid Lithium INsertion and Location of Mobile Lithium in the Defect Perovskite Li0.18Sr0.66Ti0.5Nb0.5O3", ChemPhysChem Communications, 2012, p. 1-5.

Chen et al., "Stable Lithium-ion conducting perovskite lithium-strontium-tantalum-zirconium-oxide system", Solid State Ionics, 167, 2004, 263-272.

Emery et al., "Data Descriptor: High-throughput DFT calbulations of formation energy, stability and oxygen vacancy formation energy of ABO3 perovskites", Scientific Data, Nature.com, 2017.

Naguma et al, "Candidate comounds with perovskite structure for high lithium ionic conductivity", Solid State Ionics, 70/71, 1994, 196-202.

Morata-Orrantia et al., "A New La2/3LixTi1-xAlxO3 Solid Solution: Structure, Microstructure, and Li+ Conductivity", Chem. Mater. 14, 2002, 2871-2875.

Thangadurai et al., "Single Element Approach for Electrochromic Display Using Lithium Ion Conducting Perovskite Oxides", Electrochemical Society Proceedings vol. 2003-17, 231-242.

Yu et al., "Synthesis and characterization of perovskite-type (Li,Sr)(Zr, Nb) O3 quaternary solid electrolyte for all-solid-state batteries", Journal of Power Sources, 306, 2016, 623-629.

European Search Report for European Patent Application No. 19201022.1 dated Aug. 10, 2020.

Harada et al., "Lithium ion conductivity of A-site deficient perovskite solid solutions", Journal of Power Sources, 1999, 81-82, 777-781.

Kawakami et al., "Ionic conduction of lithium for perovskite type compounds, (Li0.05La0.317)1-xSr0.5xNbO3, (Li0.1La0.3)1-xSr0.5xNbO3 and (Li0.25La0.25)1-xM0.5xNbO3(M=Ca and Sr)", Solid State Ionics, 110, 1998, 187-192.

Watanabe et al., "Formation of perovskite solid solutions and lithium-ion conductivity in the compositions, Li2xSr1-2xMIII0.5-xTa0.5+xO3 (M=Cr, Fe, Co, Al, Ga, In, Y)", Journal of Power Sources, 68, 1997, 421-426.

* cited by examiner

MIXED CONDUCTOR, ELECTROCHEMICAL DEVICE INCLUDING THE SAME, AND PREPARATION METHOD OF MIXED CONDUCTOR

CROSS-REFERENCE TO RELATED APPLICATIONS

This application claims priority to and the benefit of U.S. Provisional Application No. 62/749,862, filed on Oct. 24, 2018, in the U.S. Patent Office, and Korean Patent Application No. 10-2018-0133894, filed on Nov. 2, 2018, in the Korean Intellectual Property Office, the contents of which are incorporated herein in their entirety by reference.

BACKGROUND

1. Field

The present disclosure relates to a mixed conductor, an electronic device including the same, and a method of preparing the mixed conductor.

2. Description of the Related Art

In electrochemical devices such as batteries, electrochemical reactions occur at an electrode between ions and electrons that are transferred through separate paths between a plurality of electrodes.

In an electrode, an organic liquid electrolyte is used as an ion conductor and a carbonaceous conductive material is used as an electron conductor. Thus an electrode contains a mixture of the ion conductor and the electron conductor. The organic liquid electrolyte and the carbonaceous conductive material are easily decomposed by radicals involved in electrochemical reactions, causing a deterioration in performance of a battery.

Therefore, there is a need to develop a conductor that transfers ions and electrons simultaneously while being stable to by-products of electrochemical reactions in the device.

SUMMARY

Provided is a mixed ionic and electronic conductor that transfers ions and electrons simultaneously.

Provided is an electrochemical device including the mixed conductor.

Provided are methods of preparing the mixed conductor.

Additional aspects will be set forth in part in the description which follows and, in part, will be apparent from the description, or may be learned by practice of the presented embodiments.

According to an aspect of an embodiment, a mixed ionic and electronic conductor is represented by Formula 1

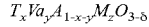
$$T_xVa_yA_{1-x-y}M_zO_{3-\delta} \quad \text{Formula 1}$$

wherein, in Formula 1,
T includes at least one monovalent cation,
A includes at least one of a monovalent cation, a divalent cation, and a trivalent cation,
M includes at least one of a trivalent cation, a tetravalent cation, and a pentavalent cation, and is an element other than Ti and Zr,
Va is a vacancy,
δ is an oxygen vacancy,
$0<x$, $y\leq 0.25$, $0<z\leq 1$, and $0\leq\delta\leq 1$.

According to an aspect an electrochemical device includes the mixed conductor.

According to an aspect, a method of preparing a mixed conductor includes: mixing a precursor of element T, a precursor of element A, and a precursor of element M to prepare a mixture; and heat treating the mixture to prepare the mixed conductor, wherein the mixed conductor is represented by Formula 1

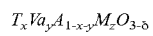
$$T_xVa_yA_{1-x-y}M_zO_{3-\delta} \quad \text{Formula 1}$$

wherein, in Formula 1,
T includes at least one monovalent cation,
A includes at least one of a monovalent cation, a divalent cation, and a trivalent cation,
M includes at least one of a trivalent cation, a tetravalent cation, and a pentavalent cation, and is an element other than Ti and Zr,
Va is a vacancy,
δ is an oxygen vacancy,
$0<x$, $y\leq 0.25$, $0<z\leq 1$, and $0\leq\delta\leq 1$.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
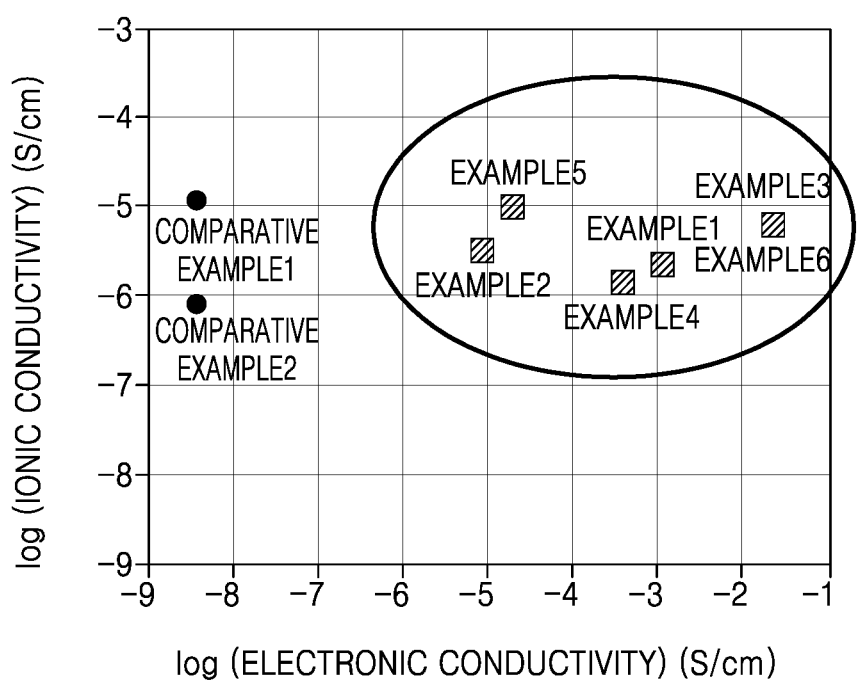
FIG. 1 is a graph of log ionic conductivity (Siemens per centimeter, S/cm) versus log electronic conductivity (Siemens per centimeter, S/cm) of mixed conductors according to Examples 1 to 6 and conductors prepared according to Comparative Examples 1 and 2.

Reference will now be made in detail to embodiments, Examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The disclosed embodiment allows for various changes and numerous embodiments, and a particular embodiment will be illustrated in the drawings and described in detail in the written description. However, there is no intent to limit the disclosure to the particular forms disclosed, but on the contrary, the disclosure is to cover all modifications, equivalents, and alternatives falling within the spirit and scope of the disclosure.

The terms used in the present specification are merely used to describe particular embodiments, and are not intended to limit the present disclosure. An expression used in the singular encompasses the expression of the plural, unless it has a clearly different meaning in the context. Hereinafter, it is to be understood that the terms such as "including" or "having" are intended to indicate the existence of features, numbers, operations, components, parts, elements, materials, or combinations thereof disclosed in the specification, and are not intended to preclude the possibility that one or more other features, numbers, operations, components, parts, elements, materials, or combinations thereof may exist or may be added. The "/", as used herein, may be interpreted as either "and" or "or."

In the drawings, thicknesses of layers and regions may be enlarged or reduced for clarity. Throughout the specification, like reference numerals denote like elements. Throughout the specification, it will be understood that when one element such as layer, region, or plate, is referred to as being "on" another element, it can be directly on the other element, or intervening elements may also be present therebetween. It will be understood that, although the terms first, second, etc. may be used herein to describe various components, these components should not be limited by these terms. These terms are only used to distinguish one component from another. In contrast, when an element is referred to as being "directly on" another element, there are no intervening elements present. Thus, "a first element," "component," "region," "layer," or "section" discussed below could be termed a second element, component, region, layer or section without departing from the teachings herein.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Throughout the specification, the term "mixed conductor" or "mixed ionic and electronic conductor" refers to a conductor providing ionic conductivity and electronic conductivity simultaneously. For example, the mixed conductor used herein provides improved ionic conductivity and electronic conductivity simultaneously, e.g., when compared with $Li_{0.34}La_{0.55}TiO_3$.

Hereinafter, a mixed conductor, an electrochemical device including the same, and a method of preparing the mixed conductor according to example embodiments of the present disclosure will be described in detail.

A mixed conductor according to an embodiment is represented by Formula 1.

$$T_xVa_yA_{1-x-y}M_zO_{3-\delta}$$ Formula 1

In Formula 1,

T includes at least one monovalent cation,

A includes at least one selected from a monovalent cation, a divalent cation, and a trivalent cation, M includes at least one selected from a trivalent cation, a tetravalent cation, and a pentavalent cation, M is an element other than Ti and Zr, Va is a vacancy, δ is an oxygen vacancy, 0<x, y≤0.25, 0<z≤1, and 0≤δ≤1.

When the mixed conductor includes at least one element T including a monovalent cation, at least one element A selected from a monovalent cation, a divalent cation, and a trivalent cation, a vacancy Va, and at least one element M selected from a trivalent cation, a tetravalent cation, and a pentavalent cation other than Ti and Zr, both ionic conductivity and electronic conductivity are improved. In addition, the mixed conductor may be an inorganic oxide and provide improved chemical stability against radicals involved in electrochemical reactions.

In Formula 1, T may be a monovalent alkali metal cation. For example, T may include at least one element of Li, Na, and K. In an embodiment, T is Li, Na, or K. For example, T may be Li.

In Formula 1, A is at least one of H, Na, K, Rb, Cs, Ca, Sr, Ba, Sc, Y, La, Ce, Pr, Nd, Pm, Sm, Gd, Tb, Dy, Ho, Tm, Yb, Lu, Er, and Eu. According to an embodiment, A is at least one of a divalent cation and a trivalent cation in Formula 1. For example, in Formula 1, A may be Ca, Sr, Ba, Sc, Y, La, Ce, Pr, Nd, Pm, Sm, Gd, Tb, Dy, Ho, Tm, Yb, Lu, Er, or Eu. An embodiment in which A is a lanthanide is mentioned. In an embodiment A is La.

In Formula 1, M may include at least one of Ni, Pd, Pb, Fe, Ir, Co, Rh, Mn, Cr, Ru, Re, Sn, V, Ge, W, Sc, Nb, Ta, and Mo. An embodiment in which A is at least one of Mn, Co, Ru, Nb, and Ta is mentioned.

In Formula 1, M may include two or more types of cations. For example, the two or more types of cations may have the same or different oxidation states. For example, the two or more different cations may have different oxidation states. For example, in Formula 1, M may include both a cation having a +3 oxidation state and a cation having a +4 oxidation state, both a cation having a +3 oxidation state and a cation having a +5 oxidation state, or both a cation having a +4 oxidation state and a cation having a +5 oxidation state. When M includes two or more types of cations, use of a cation having a selected oxidation state to maintain conductivity can be avoided. Rather, by combining two or more types of cations having different oxidation states in such a manner to balance a total oxidation state, a mixed conductor having suitable ionic and electrical conductivity may be prepared.

In Formula 1, M may comprise at least one pentavalent cation. According to an embodiment, an ionic radius of the pentavalent cation may be about 0.6 angstroms (Å) or greater. For example, the ionic radius of the pentavalent cation is about 0.61 Å or greater, about 0.62 Å or greater, about 0.63 Å or greater, or about 0.64 Å or greater, e.g., about 0.6 Å to about 2 Å, about 0.6 Å to about 1.5 Å, about 0.6 Å to about 1.0 Å about 0.62 Å to about 0.8 Å, or about 0.64 Å to about 0.7 Å. When the pentavalent cation having the above-described ionic radius is used, an effect of enlarging a space, in which ions move, may be obtained in a crystal structure of the mixed conductor. As a result, resistance to ionic conduction decreases, and thus ionic conductivity is improved.

M does not include Ti or Zr. Titanium oxide and zirconium oxide are insulators. The rutile form of titanium oxide, for example, has a crystal structure comprising $TiO_6$ octahedra, in which Ti binds to 6 oxygen atoms. Rutile has low electronic conductivity. In addition, titanium oxide and zirconium oxide, each including Li are known as perovskite- or garnet-based ion-transferable solid electrolytes which are electronic insulators without electronic conductivity.

In Formula 1, $0<x<0.3$. For example, $0<x\leq0.25$, $0<x\leq0.22$, $0\leq x\leq0.20$, or $0.17\leq x\leq0.25$. When x is outside of these ranges, ionic conductivity may be insufficient or a crystal structure of the mixed conductor becomes unstable.

In Formula 1, a stoichiometric amount of A may satisfy $0.5<1-x-y<0.7$, $0.52<1-x-y<0.68$, or $0.55<1-x-y<0.65$. When the stoichiometric amount of A is less than 0.5, a vacancy content increases, which, and while not wanting to be bound by theory, it is understood can cause an unstable crystal structure of the mixed conductor. When the stoichiometric amount of A exceeds 0.7, sufficient ionic conductivity may not be obtained.

In Formula 1, a suitable composition of x and y for obtaining ionic conductivity may be calculated according to Equation 1.

$$\sigma(Li^+) = \left(\frac{C_{eff}}{kT}\right)(D_0 e^{-E_b/kT}) \quad \text{Equation 1}$$

In Equation 1, $\sigma(Li^+)$ is Li ion conductivity, $C_{eff}$ is effective concentration, k is Boltzmann constant, T is kelvin temperature, Do is diffusivity, and Eb is activation barrier Energy.

Figure 3:
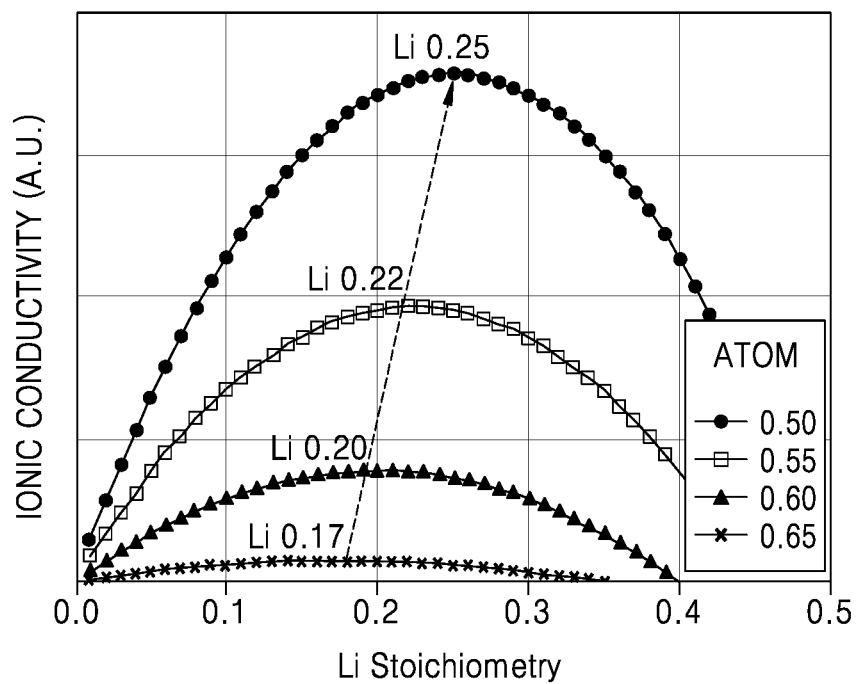
FIG. 3 is a graph of ionic conductivity (arbitrary units, A.U.) versus lithium content (stoichiometric amount of Li for selected stoichiometric amounts of A atoms)
Figure 4:
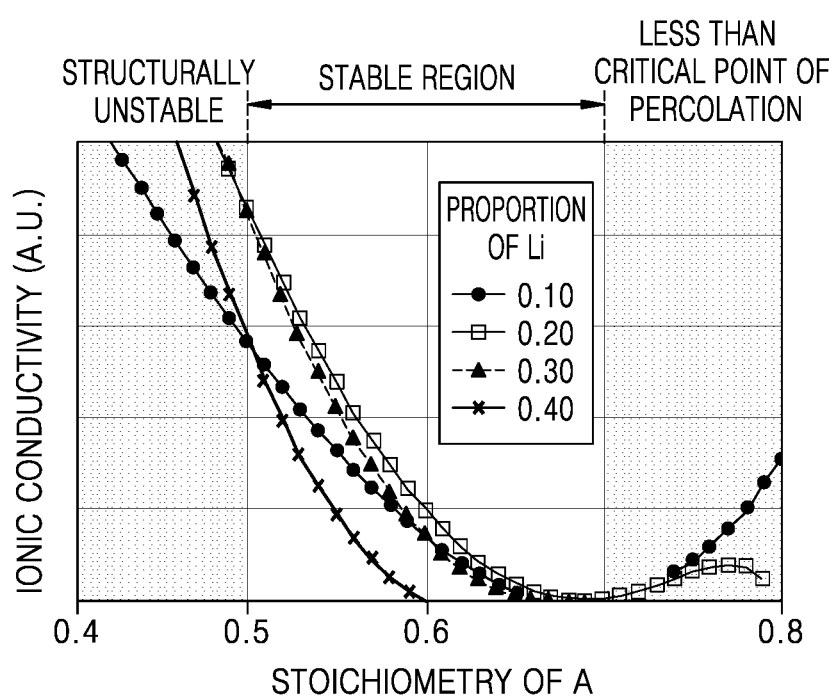
FIG. 4 is a graph of ionic conductivity (arbitrary units, A.U.) versus stoichiometric amount of A atoms for selected stoichiometric amounts of Li atoms.

Graphs obtained according to Equation 1 are shown in FIGS. 3 and 4. Referring to the graphs, it may be confirmed that a suitable amount of x satisfies $0<x\leq0.25$, and a suitable range of $1-x-y$ satisfies $0.5<1-x-y<0.7$.

The compound of Formula 1 may be represented by Formula 2.

$$T_x Va_y A_{1-x-y} M'_z M''_{1-z} O_{3-\delta} \quad \text{Formula 2}$$

In Formula 2,

T includes at least one monovalent cation,

A includes at least one of a monovalent cation, a divalent cation, and a trivalent cation, M' and M" each independently include at least one of a trivalent cation, a tetravalent cation, and a pentavalent cation, M' and M" are each independently an element other than Ti and Zr, Va is a vacancy, δ is an oxygen vacancy, and $0<x$, $y\leq0.25$, $0<z<1$, and $0\leq\delta\leq1$.

In the mixed conductor, an oxygen vacancy formation energy value of M' may be 2.9 eV or less. For example, the oxygen vacancy formation energy value of M' may be about 2.89 eV or less, about 2.88 eV or less, about 2.87 eV or less, about 2.86 eV or less, about 2.85 eV or less, about 2.84 eV or less, about 2.83 eV or less, about 2.82 eV or less, about 2.81 eV or less, about 2.80 eV or less, about 2.75 eV or less, about 2.70 eV or less, about 2.65 eV or less, about 2.60 eV or less, about 2.55 eV or less, about 2.50 eV or less, about 2.45 eV or less, about 2.40 eV or less, about 2.35 eV or less, about 2.30 eV or less, about 2.25 eV or less, about 2.20 eV or less, about 2.15 eV or less, about 2.10 eV or less, about 2.05 eV or less, about 2.00 eV or less, about 1.95 eV or less, about 1.90 eV or less, about 1.85 eV or less, about 1.80 eV or less, about 1.75 eV or less, about 1.70 eV or less, about 1.65 eV or less, about 1.60 eV or less, about 1.55 eV or less, about 1.50 eV or less, about 1.45 eV or less, about 1.40 eV or less, about 1.35 eV or less, about 1.30 eV or less, about 1.25 eV or less, about 1.20 eV or less, about 1.15 eV or less, about 1.10 eV or less, about 1.05 eV or less, or about 1.00 eV or less, and may be greater than about 0.01 eV, about 0.05 eV, about 0.1 eV, about 0.3 eV, or about 0.5 eV.

The oxygen vacancy formation energy quantum may be calculated using a method similar to that disclosed in Scientific Data 4 (2017) 170153, Antoine A. Emery, Chris Wolverton, "High-throughput DFT calculations of formation energy, stability and oxygen vacancy formation energy of $ABO_3$ perovskites", the content of which is incorporated herein by reference, it is entirety, hereinafter "Emery." The oxygen vacancy formation energy indicates a value obtained by subtracting an energy of 2 $ABO_3$, in which oxygen is combined with $A_2B_2O_5$, from a sum of energy of oxygen and energy of $A_2B_2O_5$, as shown in Equation 2.

$$E_v^O = E(A_2B_2O_5) + \mu_O - 2E(ABO_3) \quad \text{Equation 2}$$

In Equation 2, $E_v^O$ is oxygen vacancy formation energy, $E(A_2B_2O_5)$ is an energy of $A_2B_2O_5$, $\mu_O$ is chemical potential of oxygen, $E(ABO_3)$ is an energy of $ABO_3$. $A_2B_2O_5$ is obtained by removing one oxygen atom from $A_2B_2O_6$. A and B are as defined in Emery.

Calculated oxygen vacancy formation energy of exemplary elements is shown in Table 1.

TABLE 1

| B ion (+4) | Oxygen vacancy formation energy (eV/O) |
|---|---|
| Ni | 0.06 |
| Pd | 0.79 |

TABLE 1-continued

| B ion (+4) | Oxygen vacancy formation energy (eV/O) |
|---|---|
| Pb | 1.09 |
| Fe | 1.16 |
| Ir | 1.26 |
| Co | 1.27 |
| Rh | 1.37 |
| Mn | 1.65 |
| Cr | 1.66 |
| Ru | 1.87 |
| Re | 2.19 |
| Sn | 2.34 |
| V | 2.58 |
| Ge | 2.69 |
| W | 2.79 |
| Zr | 2.88 |
| Ti | 2.98 |

In Formula 2 above, M' may include at least one of a trivalent cation and a tetravalent cation, and M" may include at least one pentavalent cation. For example, M' and M" may each independently be Ni, Pd, Pb, Fe, Ir, Co, Rh, Mn, Cr, Ru, Re, Sn, V, Ge, W, Sc, Nb, Ta, Mo, and Zn.

For example, an electronic conductivity of the mixed conductor is about $4\times10^{-9}$ S/cm or greater, about $1\times10^{-8}$ S/cm or greater, about $4\times10^{-8}$ S/cm or greater, about $1\times10^{-7}$ S/cm or greater, about $4\times10^{-7}$ S/cm or greater, about $1\times10^{-6}$ S/cm or greater, or about $1\times10^{-5}$ S/cm or greater at 25° C., e.g., about $4\times10^{-9}$ S/cm to about $1\times10^{-3}$ S/cm, about $1\times10^{-8}$ S/cm to about $5\times10^{-4}$ S/cm, or about $4\times10^{-8}$ S/cm to about $5\times10^{-4}$ S/cm at 25° C. When the mixed conductor has such a high electronic conductivity, an internal resistance of an electrochemical device including the mixed conductor is reduced.

For example, an ionic conductivity of the mixed conductor may be about $1\times10^{-6}$ S/cm or greater, about $5\times10^{-6}$ S/cm or greater, about $1\times10^{-5}$ S/cm or greater, or about $5\times10^{-5}$ S/cm or greater, e.g., about $1\times10^{-6}$ S/cm to about $1\times10^{-3}$ S/cm, about $3\times10^{-6}$ S/cm to about $7\times10^{-4}$, or about $6\times10^{-6}$ S/cm to about $3\times10^{-4}$. When the mixed conductor has such a high ionic conductivity, internal resistance of an electrochemical device including the mixed conductor is reduced.

The mixed conductor may have a phase with a perovskite or perovskite-like crystal structure.

For example, the mixed conductor has an $AMO_3$-type phase, e.g., perovskite-type structure, in which a vacancy and Li are arranged in a portion of the A site and an orthorhombic, cubic, monoclinic, or triclinic crystalline phase, or a combination thereof having an oxygen defect. In addition, the mixed conductor has improved Li ion conductivity. While not wanting to be bound by theory, it is understood that the improved Li ion conductivity results because of a concentration of Li in the A site. Also the improved electronic conductivity is understood to be provided by introducing a metal M having a low oxygen vacancy formation energy into the M site.

The structure of the mixed conductor compound includes, for example, an $MO_6$ octahedron in which six oxygen atoms are located at vertices, such that M of Formula 1 is located at the center of the octahedron, and corners are shared. In addition, the A (e.g., La), the T (e.g., Li), and a vacancy are randomly distributed in a space formed by connecting the vertices of the octahedron to provide, e.g., A, T, or vacancy centered octahedra. In the mixed conductor compound, Li ions are conducted through an empty layer of the A (e.g., La), and electrons are conducted through the metal M ion layer.

The mixed conductor compound may include a cubic crystalline phase. For example, the mixed conductor compound, according to an embodiment, may exhibit a peak corresponding to a (100) plane when analyzed by X-ray diffraction analysis. For example, the mixed conductor compound according to an embodiment exhibits a peak corresponding to the (100) plane in XRD analysis.

Figure 2:
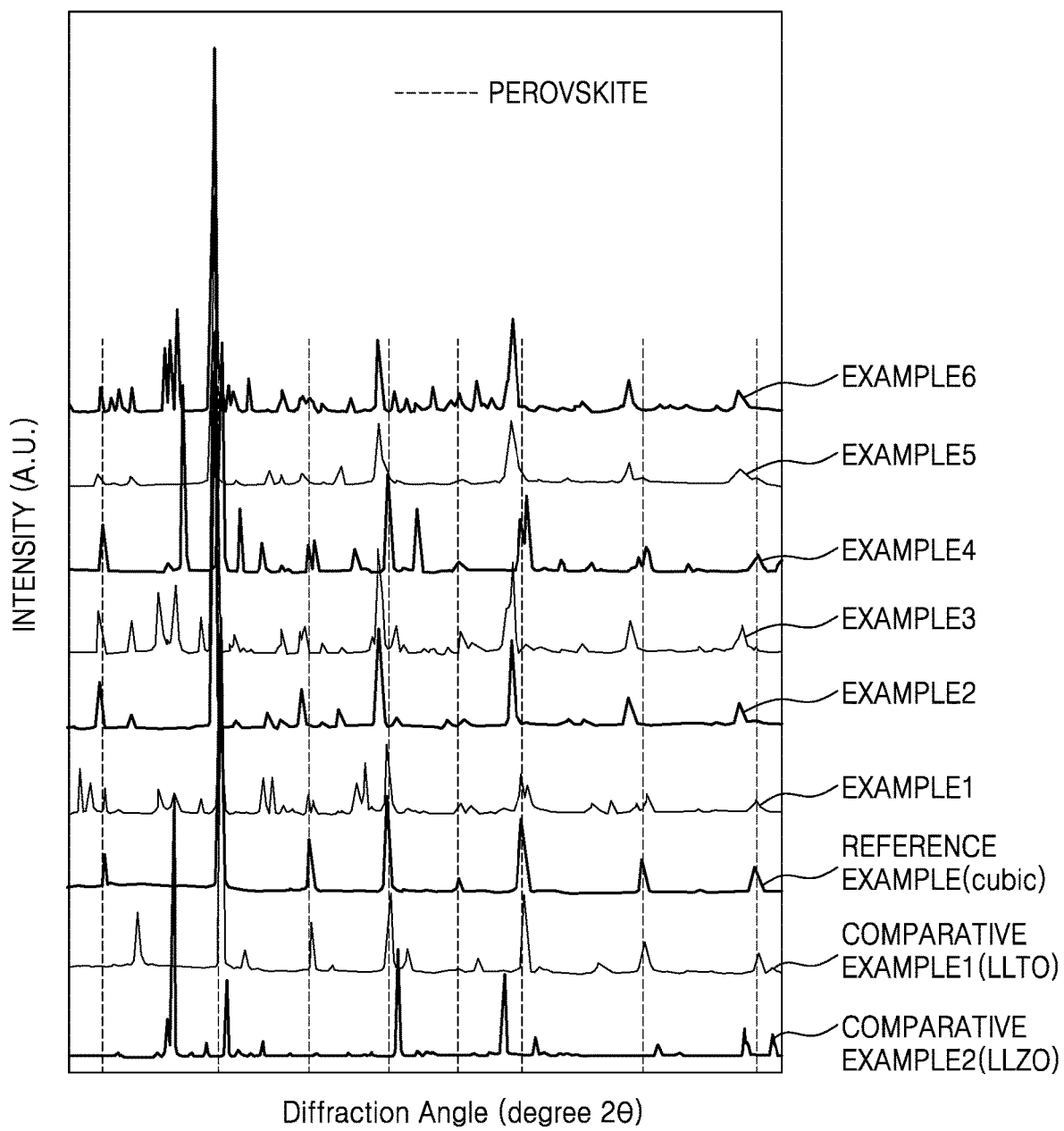
FIG. 2 is a graph of intensity (arbitrary units, A.U.) versus diffraction angle (degrees two-theta) showing the results of XRD analysis of mixed conductors and conductors prepared according to Examples 1 to 6, Comparative Examples 1 and 2, and a reference example.

For example, in the XRD analysis, the mixed conductor compound according to an embodiment may have peaks at a diffraction angle (2θ) of 23.0°±2.5°, at a diffraction angle (2θ) of 32.5°±2.5°, at a diffraction angle (2θ) of 40.0°±2.5°, at a diffraction angle (2θ) of 46.5°±2.5°, at a diffraction angle (2θ) of 53.0°±2.5°, at a diffraction angle (2θ) of 58.0°±2.5°, at a diffraction angle (2θ) of 68.0°±2.5°, and at a diffraction angle (2θ) of 78.0°±2.5°. These peaks are shown in FIG. 2. Particularly, the peak corresponding to the (100) plane in the XRD analysis, at a diffraction angle (2θ) of 23°±2.5°, indicating the cubic crystal structure is shown.

For example, in Formula 2, the mixed conductor compound according to an embodiment may be $Li_{0.23}A_{0.55}M'_{0.88}M''_{0.12}O_3$, $Li_{0.23}A_{0.55}M'_{0.44}M''_{0.56}O_3$, $Li_{0.23}A_{0.55}M'_{0.33}M''_{0.67}O_3$, and $Li_{0.23}A_{0.55}M'_{0.16}M''_{0.84}O_3$. However, the mixed conductor compound is not limited thereto and may include a compound having a stoichiometric ratio such that a sum of oxidation states of the cation and the anion is 0, i.e., in a neutral state.

For example, in the compound represented by $Li_{0.23}A_{0.55}M'_{0.88}M''_{0.12}O_3$, A is a trivalent cation, M' is a tetravalent cation, M" is a pentavalent cation, and a stoichiometric amount of the vacancy in the compound is 0.22.

For example, in the compound represented by $Li_{0.23}A_{0.55}M'_{0.44}M''_{0.5603}$, A is a trivalent cation, M' is a trivalent cation, M" is a pentavalent cation, and a stoichiometric amount of the vacancy in the compound is 0.22.

For example, in the compound represented by $Li_{0.23}A_{0.55}M'_{0.33}M''_{0.6703}$, A is a divalent cation, M' is a tetravalent cation, M" is a pentavalent cation, and a stoichiometric amount of the vacancy in the compound is 0.22.

For example, in the compound represented by $Li_{0.23}A_{0.55}M'_{0.16}M''_{0.8403}$, A is a divalent cation, M' is a trivalent cation, M" is a pentavalent cation, and a stoichiometric amount of the vacancy in the compound is 0.22.

For example, the mixed conductor may comprise at least one compound represented by $Li_{0.23}La_{0.55}Mn_{0.88}Nb_{0.12}O_{3-\delta}$ (0≤δ≤1), $Li_{0.23}La_{0.55}Co_{0.88}Nb_{0.12}O_{3-\delta}$ (0≤δ≤1), $Li_{0.23}La_{0.55}Ru_{0.88}Nb_{0.12}O_{3-\delta}$ (0≤δ≤1), $Li_{0.23}La_{0.55}Ni_{0.88}Nb_{0.12}O_{3-\delta}$ (0≤δ≤1), $Li_{0.23}La_{0.55}Re_{0.88}Nb_{0.12}O_{3-\delta}$ (0≤δ≤1), $Li_{0.23}La_{0.55}Sn_{0.88}Nb_{0.12}O_{3-\delta}$ (0≤δ≤1), $Li_{0.23}La_{0.55}V_{0.88}Nb_{0.12}O_{3-\delta}$ (0≤δ≤1), $Li_{0.23}La_{0.55}Ge_{0.88}Nb_{0.12}O_{3-\delta}$ (0≤δ≤1), $Li_{0.23}La_{0.55}W_{0.88}Nb_{0.12}O_{3-\delta}$ (0≤δ≤1), $Li_{0.23}La_{0.55}Mn_{0.88}Ta_{0.12}O_{3-\delta}$ (0≤δ≤1), $Li_{0.23}La_{0.55}Co_{0.88}Ta_{0.12}O_{3-\delta}$ (0≤δ≤1), $Li_{0.23}La_{0.55}Ru_{0.88}Ta_{0.12}O_{3-\delta}$ (0≤δ≤1), $Li_{0.23}La_{0.55}Ni_{0.88}Ta_{0.12}O_{3-\delta}$ (0≤δ≤1), $Li_{0.23}La_{0.55}Re_{0.88}Ta_{0.12}O_{3-\delta}$ (0≤δ≤1), $Li_{0.23}La_{0.55}Sn_{0.88}Ta_{0.12}O_{3-\delta}$ (0≤δ≤1), $Li_{0.23}La_{0.55}V_{0.88}Ta_{0.12}O_{3-\delta}$ (0≤δ≤1), $Li_{0.23}La_{0.55}Ge_{0.88}Ta_{0.12}O_{3-\delta}$ (0≤δ≤1), $Li_{0.23}La_{0.55}W_{0.88}Ta_{0.12}O_{3-\delta}$ (0≤δ≤1), $Li_{0.23}La_{0.55}Pb_{0.44}Nb_{0.56}O_{3-\delta}$ (0≤δ≤1), $Li_{0.23}La_{0.55}Fe_{0.44}Nb_{0.56}O_{3-\delta}$ (0≤δ≤1), $Li_{0.23}La_{0.55}Ir_{0.44}Nb_{0.56}O_{3-\delta}$ (0≤δ≤1), $Li_{0.23}La_{0.55}Rh_{0.44}Nb_{0.56}O_{3-\delta}$ (0≤δ≤1), $Li_{0.23}La_{0.55}Cr_{0.44}Nb_{0.56}O_{3-\delta}$ (0≤δ≤1), $Li_{0.23}La_{0.55}Sc_{0.44}Nb_{0.56}O_{3-\delta}$ (0≤δ≤1), $Li_{0.23}La_{0.55}Pb_{0.44}Ta_{0.56}O_{3-\delta}$ ($0\leq\delta\leq1$),
$Li_{0.23}La_{0.55}Fe_{0.44}Ta_{0.56}O_{3-\delta}$ ($0\leq\delta\leq1$),
$Li_{0.23}La_{0.55}Ir_{0.44}Ta_{0.56}O_{3-\delta}$ ($0\leq\delta\leq1$),
$Li_{0.23}La_{0.55}Rh_{0.44}Ta_{0.56}O_{3-\delta}$ ($0\leq\delta\leq1$),
$Li_{0.23}La_{0.55}Cr_{0.44}Ta_{0.56}O_{3-\delta}$ ($0\leq\delta\leq1$),
$Li_{0.23}La_{0.55}Sc_{0.44}Ta_{0.56}O_{3-\delta}$ ($0\leq\delta\leq1$),
$Li_{0.23}Ca_{0.55}Mn_{0.33}Nb_{0.67}O_{3-\delta}$ ($0\leq\delta\leq1$),
$Li_{0.23}Ca_{0.55}Co_{0.33}Nb_{0.67}O_{3-\delta}$ ($0\leq\delta\leq1$),
$Li_{0.23}Ca_{0.55}Ru_{0.33}Nb_{0.67}O_{3-\delta}$ ($0\leq\delta\leq1$),
$Li_{0.23}Ca_{0.55}Ni_{0.33}Nb_{0.67}O_{3-\delta}$ ($0\leq\delta\leq1$),
$Li_{0.23}Ca_{0.55}Re_{0.33}Nb_{0.67}O_{3-\delta}$ ($0\leq\delta\leq1$),
$Li_{0.23}Ca_{0.55}Sn_{0.33}Nb_{0.67}O_{3-\delta}$ ($0\leq\delta\leq1$),
$Li_{0.23}Ca_{0.55}V_{0.33}Nb_{0.67}O_{3-\delta}$ ($0\leq\delta\leq1$),
$Li_{0.23}Ca_{0.55}Ge_{0.33}Nb_{0.67}O_{3-\delta}$ ($0\leq\delta\leq1$),
$Li_{0.23}Ca_{0.55}W_{0.33}Nb_{0.67}O_{3-\delta}$ ($0\leq\delta\leq1$),
$Li_{0.23}Ca_{0.55}Mn_{0.33}Ta_{0.67}O_{3-\delta}$ ($0\leq\delta\leq1$),
$Li_{0.23}Ca_{0.55}Co_{0.33}Ta_{0.67}O_{3-\delta}$ ($0\leq\delta\leq1$),
$Li_{0.23}Ca_{0.55}Ru_{0.33}Ta_{0.67}O_{3-\delta}$ ($0\leq\delta\leq1$),
$Li_{0.23}Ca_{0.55}Ni_{0.33}Ta_{0.67}O_{3-\delta}$ ($0\leq\delta\leq1$),
$Li_{0.23}Ca_{0.55}Re_{0.33}Ta_{0.67}O_{3-\delta}$ ($0\leq\delta\leq1$),
$Li_{0.23}Ca_{0.55}Sn_{0.33}Ta_{0.67}O_{3-\delta}$ ($0\leq\delta\leq1$),
$Li_{0.23}Ca_{0.55}V_{0.33}Ta_{0.67}O_{3-\delta}$ ($0\leq\delta\leq1$),
$Li_{0.23}Ca_{0.55}Ge_{0.33}Ta_{0.67}O_{3-\delta}$ ($0\leq\delta\leq1$),
$Li_{0.23}Ca_{0.55}W_{0.33}Ta_{0.67}O_{3-\delta}$ ($0\leq\delta\leq1$),
$Li_{0.23}Sr_{0.55}Mn_{0.33}Nb_{0.67}O_{3-\delta}$ ($0\leq\delta\leq1$),
$Li_{0.23}Sr_{0.55}Co_{0.33}Nb_{0.67}O_{3-\delta}$ ($0\leq\delta\leq1$),
$Li_{0.23}Sr_{0.55}Ru_{0.33}Nb_{0.67}O_{3-\delta}$ ($0\leq\delta\leq1$),
$Li_{0.23}Sr_{0.55}Ni_{0.33}Nb_{0.67}O_{3-\delta}$ ($0\leq\delta\leq1$),
$Li_{0.23}Sr_{0.55}Re_{0.33}Nb_{0.67}O_{3-\delta}$ ($0\leq\delta\leq1$),
$Li_{0.23}Sr_{0.55}Sn_{0.33}Nb_{0.67}O_{3-\delta}$ ($0\leq\delta\leq1$),
$Li_{0.23}Sr_{0.55}V_{0.33}Nb_{0.67}O_{3-\delta}$ ($0\leq\delta\leq1$),
$Li_{0.23}Sr_{0.55}Ge_{0.33}Nb_{0.67}O_{3-\delta}$ ($0\leq\delta\leq1$),
$Li_{0.23}Sr_{0.55}W_{0.33}Nb_{0.67}O_{3-\delta}$ ($0\leq\delta\leq1$),
$Li_{0.23}Sr_{0.55}Mn_{0.33}Ta_{0.67}O_{3-\delta}$ ($0\leq\delta\leq1$),
$Li_{0.23}Sr_{0.55}Co_{0.33}Ta_{0.67}O_{3-\delta}$ ($0\leq\delta\leq1$),
$Li_{0.23}Sr_{0.55}Ru_{0.33}Ta_{0.67}O_{3-\delta}$ ($0\leq\delta\leq1$),
$Li_{0.23}Sr_{0.55}Ni_{0.33}Ta_{0.67}O_{3-\delta}$ ($0\leq\delta\leq1$),
$Li_{0.23}Sr_{0.55}Re_{0.33}Ta_{0.67}O_{3-\delta}$ ($0\leq\delta\leq1$),
$Li_{0.23}Sr_{0.55}Sn_{0.33}Ta_{0.67}O_{3-\delta}$ ($0\leq\delta\leq1$),
$Li_{0.23}Sr_{0.55}V_{0.33}Ta_{0.67}O_{3-\delta}$ ($0\leq\delta\leq1$),
$Li_{0.23}Sr_{0.55}Ge_{0.33}Ta_{0.67}O_{3-\delta}$ ($0\leq\delta\leq1$),
$Li_{0.23}Sr_{0.55}W_{0.33}Ta_{0.67}O_{3-\delta}$ ($0\leq\delta\leq1$),
$Li_{0.23}Ba_{0.55}Mn_{0.33}Nb_{0.67}O_{3-\delta}$ ($0\leq\delta\leq1$),
$Li_{0.23}Ba_{0.55}Co_{0.33}Nb_{0.67}O_{3-\delta}$ ($0\leq\delta\leq1$),
$Li_{0.23}Ba_{0.55}Ru_{0.33}Nb_{0.67}O_{3-\delta}$ ($0\leq\delta\leq1$),
$Li_{0.23}Ba_{0.55}Ni_{0.33}Nb_{0.67}O_{3-\delta}$ ($0\leq\delta\leq1$),
$Li_{0.23}Ba_{0.55}Re_{0.33}Nb_{0.67}O_{3-\delta}$ ($0\leq\delta\leq1$),
$Li_{0.23}Ba_{0.55}Sn_{0.33}Nb_{0.67}O_{3-\delta}$ ($0\leq\delta\leq1$),
$Li_{0.23}Ba_{0.55}V_{0.33}Nb_{0.67}O_{3-\delta}$ ($0\leq\delta\leq1$),
$Li_{0.23}Ba_{0.55}Ge_{0.33}Nb_{0.67}O_{3-\delta}$ ($0\leq\delta\leq1$),
$Li_{0.23}Ba_{0.55}W_{0.33}Nb_{0.67}O_{3-\delta}$ ($0\leq\delta\leq1$),
$Li_{0.23}Ba_{0.55}Mn_{0.33}Ta_{0.67}O_{3-\delta}$ ($0\leq\delta\leq1$),
$Li_{0.23}Ba_{0.55}Co_{0.33}Ta_{0.67}O_{3-\delta}$ ($0\leq\delta\leq1$),
$Li_{0.23}Ba_{0.55}Ru_{0.33}Ta_{0.67}O_{3-\delta}$ ($0\leq\delta\leq1$),
$Li_{0.23}Ba_{0.55}Ni_{0.33}Ta_{0.67}O_{3-\delta}$ ($0\leq\delta\leq1$),
$Li_{0.23}Ba_{0.55}Re_{0.33}Ta_{0.67}O_{3-\delta}$ ($0\leq\delta\leq1$),
$Li_{0.23}Ba_{0.55}Sn_{0.33}Ta_{0.67}O_{3-\delta}$ ($0\leq\delta\leq1$),
$Li_{0.23}Ba_{0.55}V_{0.33}Ta_{0.67}O_{3-\delta}$ ($0\leq\delta\leq1$),
$Li_{0.23}Ba_{0.55}Ge_{0.33}Ta_{0.67}O_{3-\delta}$ ($0\leq\delta\leq1$),
$Li_{0.23}Ba_{0.55}W_{0.33}Ta_{0.67}O_{3-\delta}$ ($0\leq\delta\leq1$),
$Li_{0.23}Ca_{0.55}Pb_{0.16}Nb_{0.84}O_{3-\delta}$ ($0\leq\delta\leq1$),
$Li_{0.23}Ca_{0.55}Fe_{0.16}Nb_{0.84}O_{3-\delta}$ ($0\leq\delta\leq1$),
$Li_{0.23}Ca_{0.55}Ir_{0.16}Nb_{0.84}O_{3-\delta}$ ($0\leq\delta\leq1$),
$Li_{0.23}Ca_{0.55}Rh_{0.16}Nb_{0.84}O_{3-\delta}$ ($0\leq\delta\leq1$),
$Li_{0.23}Ca_{0.55}Cr_{0.16}Nb_{0.84}O_{3-\delta}$ ($0\leq\delta\leq1$),
$Li_{0.23}Ca_{0.55}Sc_{0.16}Nb_{0.84}O_{3-\delta}$ ($0\leq\delta\leq1$),
$Li_{0.23}Ca_{0.55}Pb_{0.16}Ta_{0.84}O_{3-\delta}$ ($0\leq\delta\leq1$),
$Li_{0.23}Ca_{0.55}Fe_{0.16}Ta_{0.84}O_{3-\delta}$ ($0\leq\delta\leq1$),
$Li_{0.23}Ca_{0.55}Ir_{0.16}Ta_{0.84}O_{3-\delta}$ ($0\leq\delta\leq1$),
$Li_{0.23}Ca_{0.55}Rh_{0.16}Ta_{0.84}O_{3-\delta}$ ($0\leq\delta\leq1$),
$Li_{0.23}Ca_{0.55}Cr_{0.16}Ta_{0.84}O_{3-\delta}$ ($0\leq\delta\leq1$),
$Li_{0.23}Ca_{0.55}Sc_{0.16}Ta_{0.84}O_{3-\delta}$ ($0\leq\delta\leq1$),
$Li_{0.23}Sr_{0.55}Pb_{0.16}Nb_{0.84}O_{3-\delta}$ ($0\leq\delta\leq1$),
$Li_{0.23}Sr_{0.55}Fe_{0.16}Nb_{0.84}O_{3-\delta}$ ($0\leq\delta\leq1$),
$Li_{0.23}Sr_{0.55}Ir_{0.16}Nb_{0.84}O_{3-\delta}$ ($0\leq\delta\leq1$),
$Li_{0.23}Sr_{0.55}Rh_{0.16}Nb_{0.84}O_{3-\delta}$ ($0\leq\delta\leq1$),
$Li_{0.23}Sr_{0.55}Cr_{0.16}Nb_{0.84}O_{3-\delta}$ ($0\leq\delta\leq1$),
$Li_{0.23}Sr_{0.55}Sc_{0.16}Nb_{0.84}O_{3-\delta}$ ($0\leq\delta\leq1$),
$Li_{0.23}Sr_{0.55}Pb_{0.16}Ta_{0.84}O_{3-\delta}$ ($0\leq\delta\leq1$),
$Li_{0.23}Sr_{0.55}Fe_{0.16}Ta_{0.84}O_{3-\delta}$ ($0\leq\delta\leq1$),
$Li_{0.23}Sr_{0.55}Ir_{0.16}Ta_{0.84}O_{3-\delta}$ ($0\leq\delta\leq1$),
$Li_{0.23}Sr_{0.55}Rh_{0.16}Ta_{0.84}O_{3-\delta}$ ($0\leq\delta\leq1$),
$Li_{0.23}Sr_{0.55}Cr_{0.16}Ta_{0.84}O_{3-\delta}$ ($0\leq\delta\leq1$),
$Li_{0.23}Sr_{0.55}Sc_{0.16}Ta_{0.84}O_{3-\delta}$ ($0\leq\delta\leq1$),
$Li_{0.23}Ba_{0.55}Pb_{0.16}Nb_{0.84}O_{3-\delta}$ ($0\leq\delta\leq1$),
$Li_{0.23}Ba_{0.55}Fe_{0.16}Nb_{0.84}O_{3-\delta}$ ($0\leq\delta\leq1$),
$Li_{0.23}Ba_{0.55}Ir_{0.16}Nb_{0.84}O_{3-\delta}$ ($0\leq\delta\leq1$),
$Li_{0.23}Ba_{0.55}Rh_{0.16}Nb_{0.84}O_{3-\delta}$ ($0\leq\delta\leq1$),
$Li_{0.23}Ba_{0.55}Cr_{0.16}Nb_{0.84}O_{3-\delta}$ ($0\leq\delta\leq1$),
$Li_{0.23}Ba_{0.55}Sd_{0.16}Nb_{0.84}O_{3-\delta}$ ($0\leq\delta\leq1$),
$Li_{0.23}Ba_{0.55}Pb_{0.16}Ta_{0.84}O_{3-\delta}$ ($0\leq\delta\leq1$),
$Li_{0.23}Ba_{0.55}Fe_{0.16}Ta_{0.84}O_{3-\delta}$ ($0\leq\delta\leq1$),
$Li_{0.23}Ba_{0.55}Ir_{0.16}Ta_{0.84}O_{3-\delta}$ ($0\leq\delta\leq1$),
$Li_{0.23}Ba_{0.55}Rh_{0.16}Ta_{0.84}O_{3-\delta}$ ($0\leq\delta\leq1$),
$Li_{0.23}Ba_{0.55}Cr_{0.16}Ta_{0.84}O_{3-\delta}$ ($0\leq\delta\leq1$), and
$Li_{0.23}Ba_{0.55}Sc_{0.16}Ta_{0.84}O_{3-\delta}$ ($0\leq\delta\leq1$).

The mixed conductor may be present in the form of a particle. For example, the mixed conductor particle may have an average particle diameter of about 5 nanometers (nm) to about 500 μm, about 100 nm to about 15 μm, or about 300 nm to about 10 μm, and a specific surface area of about 0.01 m²/g to about 1000 m²/g, or about 0.5 m²/g to about 100 m²/g.

An electrochemical device according to an embodiment includes the above-described mixed conductor. Since the electrochemical device includes the mixed conductor that is chemically stable and transfers ions and electrons simultaneously, deterioration of the electrochemical device is inhibited.

For example, the electrochemical device may be a battery, an accumulator, a supercapacitor, a fuel cell, a sensor, or an electrochromic device. However, the electrochemical device is not limited thereto and may be any suitable electrochemical devices.

For example, the battery is a primary battery or a secondary battery. Examples of the battery include, but are not limited to, a lithium battery, a sodium battery. Examples of the lithium battery include, but are not limited to, a lithium ion battery and lithium-air battery. Examples of the electrochromic device include, but are not limited to, an electrochromic mirror, an electrochromic window, an electrochromic screen, and an electrochromic facade. The forgoing are limiting, and the mixed conductor may be used in any other suitable electrochemical devices.

For example, the electrochemical device including the mixed conductor is a lithium-air battery.

The lithium-air battery includes a positive electrode. The positive electrode is an air electrode. The positive electrode is located on a positive current collector.

The positive electrode includes the above-described mixed conductor. An amount of the mixed conductor may be from about 1 part by weight to about 100 parts by weight, from about 10 parts by weight to about 99 parts by weight, from about 50 parts by weight to about 98 parts by weight, from about 60 parts by weight to about 96 parts by weight, from about 70 parts by weight to about 94 parts by weight, from about 80 parts by weight to about 92 parts by weight, or from about 90 parts by weight to about 92 parts by weight, based on 100 parts by weight of the positive electrode. For example, the positive electrode may be substantially formed of the mixed conductor. The positive electrode may be prepared by sintering and/or pressing a powder of the mixed conductor and may be substantially formed of the mixed conductor. A pore may be introduced into the positive electrode by introducing a pore forming agent during formation of the positive electrode. For example, the positive electrode is porous. The positive electrode may be in the form of, for example, a porous pellet, a porous sheet, or the like. However, the form of the positive electrode is not limited thereto but may be molded according to a desired shape of the battery. Since the positive electrode is substantially formed of the mixed conductor, a structure of the positive electrode is simplified and the positive electrode is simply manufactured. For example, the positive electrode is permeable to gas such as oxygen and air. Thus, the positive electrode according to the present embodiment is distinguished from a positive electrode impermeable to a gas such as oxygen and air but permeable to ions. Since oxygen, air, and the like are easily diffused into the positive electrode that is porous and/or gas-permeable, and Li ions and/or electrons easily move through the mixed conductor included in the positive electrode, electrochemical reactions caused by oxygen, Li ions, and electrons easily occur in the positive electrode.

Alternatively, the positive electrode may further include another positive electrode material in addition to the mixed conductor.

For example, the positive electrode may include a conductive material. The conductive material is, for example, porous. Since the conductive material is porous, air easily penetrates thereinto. Any suitable conductive material having suitable porosity and/or suitable conductivity available in the art may be used. For example, a porous carbonaceous material may be used. Examples of the carbonaceous material include, but are not limited to, carbon black, graphite, graphene, activated carbon, and carbon fiber, and any other carbonaceous material available in the art may also be used. The conductive material may comprise, for example, a metallic material. The metallic material is, for example, metal fiber, metal mesh, or metal powder. For example, metal powder of copper, silver, nickel, aluminum, and the like may be used. The conductive material is, for example, an organic conductive material. For example, the organic conductive material is a polyphenylene derivative, a polythiophene derivative, or the like. The conductive materials may be used alone or in a mixture. The positive electrode may include a composite conductor as the conductive material and may further include the above-described conductive materials.

For example, the positive electrode may further includes a catalyst for oxidation/reduction of oxygen. Examples of the catalyst include, but are not limited to, a noble metal catalyst such as platinum, gold, silver, palladium, ruthenium, rhodium, and osmium, an oxide catalyst such as manganese oxide, iron oxide, cobalt oxide, and nickel oxide, or an organometallic catalyst such as cobalt phthalocyanine, and any other catalysts available in the art as catalysts for oxidation/reduction of oxygen may also be used.

The catalyst is supported, for example, on a support. Examples of the support include an oxide support, a zeolite support, a clay-based mineral support, and a carbon support. For example, the oxide support is a metal oxide support including at least one metal of Al, Si, Zr, Ti, Ce, Pr, Sm, Eu, Tb, Tm, Yb, Sb, Bi, V, Cr, Mn, Fe, Co, Ni, Cu, Nb, Mo, and W. Examples of the oxide support include alumina, silica, zirconium oxide, and titanium dioxide. Examples of the carbon support include, but are not limited to, carbon black such as ketjen black, acetylene black, channel black, and lamp black, graphite such as natural graphite, artificial graphite, and expanded graphite, activated carbon, and carbon fiber, and any other support available in the art may also be used.

For example, the positive electrode further includes a binder. For example, the binder includes a thermoplastic resin or a thermosetting resin. Examples of the binder include, but are not limited to, polyethylene, polypropylene, polytetrafluoroethylene (PTFE), polyvinylidene difluoride (PVdF), styrene-butadiene rubber, a tetrafluoroethylene-perfluoroalkylvinylether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a fluorovinylidene-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoro ethylene copolymer, and an ethylene-acrylic acid copolymer, which may be used alone or in combination, and any other suitable binders available in the art may also be used.

For example, the positive electrode is prepared according to the following method. A positive electrode slurry is prepared by mixing a conductive material, a catalyst for oxidation/reduction of oxygen, and a binder, and adding a solvent to the mixture. The positive electrode slurry is coated on a surface of a substrate and dried or press-molded on the substrate to increase a density of the electrode. The substrate is, for example, a positive current collector, a separator, or a solid electrolyte film. The positive current collector is, for example, a gas diffusion layer. The conductive material includes a composite conductor. In the positive electrode, the catalyst for oxidation/reduction of oxygen and the binder may be omitted according to desired type of the positive electrode.

The lithium-air battery includes a negative electrode. In an embodiment, the negative electrode includes lithium.

For example, the negative electrode is a Li metal thin film or a Li-based alloy thin film. The Li-based alloy is, for example, an alloy of lithium and at least one of aluminum, tin, magnesium, indium, calcium, titanium, and vanadium.

The lithium-air battery includes an electrolyte layer interposed between the positive electrode and the negative electrode.

The electrolyte layer includes at least one electrolyte of a solid electrolyte, a gel electrolyte, and a liquid electrolyte. The solid electrolyte, the gel electrolyte, and the liquid electrolyte are not particularly limited and any other suitable electrolytes available in the art may also be used.

The solid electrolyte may include at least one of a solid electrolyte including an ion-conductive inorganic material, a solid electrolyte including a polymeric ionic liquid (PIL) and a lithium salt, a solid electrolyte including an ionically conducting polymer and a lithium salt, and a solid electrolyte including an electron-conductive polymer. However, the solid electrolyte is not limited thereto and any other suitable solid electrolytes available in the art may also be used.

The ion-conductive inorganic material may include, but is not limited to, at least one selected from a glassy or amorphous metal ion conductor, a ceramic active metal ion conductor, a glass-ceramic active metal ion conductor, and any other ion-conductive inorganic materials available in the art may also be used. For example, the ion-conductive inorganic material is molded in the form of particles of a sheet.

For example, the ion-conductive inorganic material includes at least one selected from $BaTiO_3$, $Pb(Zr_xTi_{(1-x)})O_3$ ($0 \leq x \leq 1$, PZT), $Pb_{1-x}La_xZr_{1-y}Ti_yO_3$ (PLZT, $0 \leq x < 1$, and $0 \leq y < 1$), $Pb(Mg_3Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, lithium phosphate ($Li_3PO_4$), lithium titanium phosphate ($Li_xTi_y(PO_4)_3$, $0<x<2$, and $0<y<3$), lithium aluminum titanium phosphate ($Li_xAl_y$-$Ti_z(PO_4)_3$, $0<x<2$, $0<y<1$, and $0<z<3$), $Li_{1+x+y}(Al_aGa_{(1-a)})_x$ $(Ti_bGe_{(1-b)})_{2-x}Si_yP_{3-y}O_{12}$ ($0 \leq a \leq 1$, $0 \leq b \leq 1$, $0 \leq x \leq 1$, and $0 \leq y \leq 1$), lithium lanthanum titanate ($Li_xLa_yTiO_3$, $0<x<2$, and $0<y<3$), lithium germanium thiophosphate ($Li_xGe_yP_zS_w$, $0<x<4$, $0<y<1$, $0<z<1$, and $0<w<5$), ($Li_xN_y$, $0<x<4$, and $0<y<2$), $SiS_2$ type glass ($Li_xSi_yS_z$, $0<x<3$, $0<y<2$, and $0<z<4$), $P_2S_5$ type glass ($Li_xP_yS_z$, $0<x<3$, $0<y<3$, and $0<z<7$), $Li_2O$, $LiF$, $LiOH$, $Li_2CO_3$, $LiAlO_2$, $Li_2O$—$Al_2O_3$—$SiO_2$—$P_2O_5$—$TiO_2$—$Ge_{O2}$-based ceramics, and Garnet-based ceramics ($Li_{3+x}La_3M_2O_{12}$ (M=Te, Nb, Zr), or any combination thereof.

For example, the polymeric ionic liquid (PIL) includes a repeating unit having i) at least one cation of ammonium, pyrrolidinium, pyridinium, pyrimidinium, imidazolium, piperidinium, pyrazolium, oxazolium, pyridazinium, phosphonium, sulfonium, and triazolium, and ii) at least one anion of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $BF_4^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, $NO_3^-$, $Al_2Cl_7^-$, $AsF_6^-$, $SbF_6^-$, $CF_3COO^-$, $CH_3COO^-$, $CF_3SO_3^-$, $(CF_3SO_2)_3C^-$, $(CF_3CF_2SO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, and $(CF_3SO_2)_2N^-$. Examples of the polymeric ion liquid (PIL) include poly(diallyldimethylammonium)trifluoromethanesulfonylimide (poly(diallyldimethylammonium) TFSI), poly(1-allyl-3-methylimidazolium trifluoromethanesulfonylimide), and (poly((N-methyl-N-propylpiperidinium bis(trifluoromethanesulfonyl)imide)).

For example, the ionically conducting polymer includes at least one ion-conductive repeating unit derived from at least one of an ether, acrylic, methacrylic, and siloxane monomer.

Examples of the ionically conducting polymer include, but are not limited to, polyethyleneoxide (PEO), polyvinylalcohol (PVA), polyvinylpyrrolidone (PVP), polyvinylsulfone, polypropyleneoxide (PPO), polymethylmethacrylate, polyethylmethacrylate, polydimethylsiloxane, polyacrylic acid, polymethacrylic acid, polymethyl acrylate, polymethyl acrylate, poly2-ethylhexyl acrylate, polybutyl methacrylate, poly(2-ethylhexylmethacrylate), polydecyl acrylate, polyethylenevinylacetate, phosphate ester polymer, polyester sulfide, polyvinylidene fluoride (PVdF), and Li-substituted Nafion, and any other ionically conducting polymers available in the art may also be used.

Examples of the electron-conductive polymer include, but are not limited to, polyphenylene derivatives and polythiophene derivatives, and any other suitable electron-conductive polymer may also be used.

The gel electrolyte is obtained by adding a low-molecular solvent to the solid electrolyte interposed between the positive electrode and the negative electrode. For example, the gel electrolyte is a gel electrolyte obtained by adding a low-molecular weight compound, such as a solvent and an oligomer, e.g., a compound having a molecular weight of about 100 to about 1000 Daltons, to a polymer. For example, the gel electrolyte is prepared by adding a low-molecular compound, such as a solvent and an oligomer, to the solid electrolyte.

The liquid electrolyte may comprise a solvent and a lithium salt.

Examples of the solvent include at least one of an organic solvent, an ionic liquid (IL), and an oligomer. However, the solvent is not limited thereto and any other suitable solvents in a liquid state at room temperature (25° C.) may also be used.

For example, the organic solvent includes at least one of an ether-based solvent, a carbonate-based solvent, an ester-based solvent, and a ketone-based solvent. Examples of the organic solvent include, but are not limited to, propylene carbonate, ethylene carbonate, fluoroethylene carbonate, vinylethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyl dioxorane, dimethyl acetamide, dimethylsulfoxide, dioxane, 1,2-dimethoxy ethane, sulforane, dichloloethane, chlorobenzene, nitrobenzene, succinonitrile, diethylene glycol dimethyl ether (DEGDME), tetraethylene glycol dimethyl ether (TEGDME), polyethylene glycol dimethyl ether (PEGDME, Mn=~500), dimethyl ether, diethyl ether, dibutyl ether, dimethoxy ethane, and other suitable organic solvents, e.g., those which are in a liquid state at room temperature.

For example, the ionic liquid (IL) includes i) at least one cation of ammonium, pyrrolidinium, pyridinium, pyrimidinium, imidazolium, piperidinium, pyrazolium, oxazolium, pyridazinium, phosphonium, sulfonium, triazolium, and any suitable mixture thereof and ii) at least one anion of $BF_4$—, $PF_6$—, $AsF_6$—, $SbF_6$—, $AlCl_4$—, $HSO_4$—, $ClO_4$—, $CH_3SO_3$—, $CF_3CO_2$—, $(CF_3SO_2)_2N$—, $Cl$—, $Br$—, $I$—, $BF_4$—, $SO_4^-$, $PF_6$—, $ClO_4$—, $CF_3SO_3$—, $CF_3CO_2$—, $(C_2F_5SO_2)_2N$—, $(C_2F_5SO_2)(CF_3SO_2)N$—, $NO_3^-$, $Al_2Cl_7^-$, $AsF_6^-$, $SbF_6^-$, $CF_3COO^-$, $CH_3COO^-$, $CF_3SO_3^-$, $(CF_3SO_2)_3C^-$, $(CF_3CF_2SO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, and $(CF_3SO_2)_2N$—.

The lithium salt includes at least one of lithium bis(trifluoromethanesulfonyl)imide (LiTFSI), $LiPF_6$, $LiBF_4$, $LiAsF_6$, $LiClO_4$, $LiNO_3$, lithium bis(oxalato) borate (LiBOB), $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, and lithium trifluoromethanesulfonate (LiTfO). However, the lithium salt is not limited thereto, and any other suitable lithium salts available in the art may also be used. For example, a concentration of the lithium salt may be from about 0.01 M to about 5.0 M.

For example, the lithium-air battery may further include a separator interposed between the positive electrode and the negative electrode. The separator may have any suitable composition available in the lithium-air battery. Examples of the separator include a non-woven fabric of a polymer such as a polypropylene non-woven fabric or a polyphenylene sulfide non-woven fabric, a porous film of an olefin resin such as polyethylene or polypropylene, glass fibers, and any combination of at least two thereof.

For example, the electrolyte layer may have a structure in which the separator is impregnated with a solid polymer electrolyte or the separator is impregnated with a liquid electrolyte. The electrolyte layer in which the separator is impregnated with the solid polymer electrolyte may be prepared by, for example, locating a solid polymer electrolyte film on a surface or opposite surfaces of the separator and simultaneously rolling the solid polymer electrolyte film and the separator. The electrolyte layer in which the separator is impregnated with the liquid electrolyte is prepared by injecting the liquid electrolyte including a lithium salt into the separator.

The lithium-air battery is prepared by locating a negative electrode on a surface of a case, locating an electrolyte layer on the negative electrode, locating a positive electrode on the electrolyte layer, locating a porous positive current collector on the positive electrode, locating a pressing member that allows air to reach to the air electrode on the porous positive current collector, and pressing the stacked structure to prepare a cell. The case may be divided into an upper portion in contact with the negative electrode and a lower portion in contact with the air electrode, an insulating resin may be interposed between the upper and lower portions to electrically insulate the positive electrode from the negative electrode.

The lithium-air battery may be used as a primary battery or a secondary battery. The lithium-air battery may be in the form of a coin, a button, a sheet, a stack, a cylinder, a plane, or a horn, but the shape of the lithium-air battery is not particularly limited thereto. The lithium-air battery may also be applied to provide a medium or large-sized batteries for electric vehicles.

Figure 5:
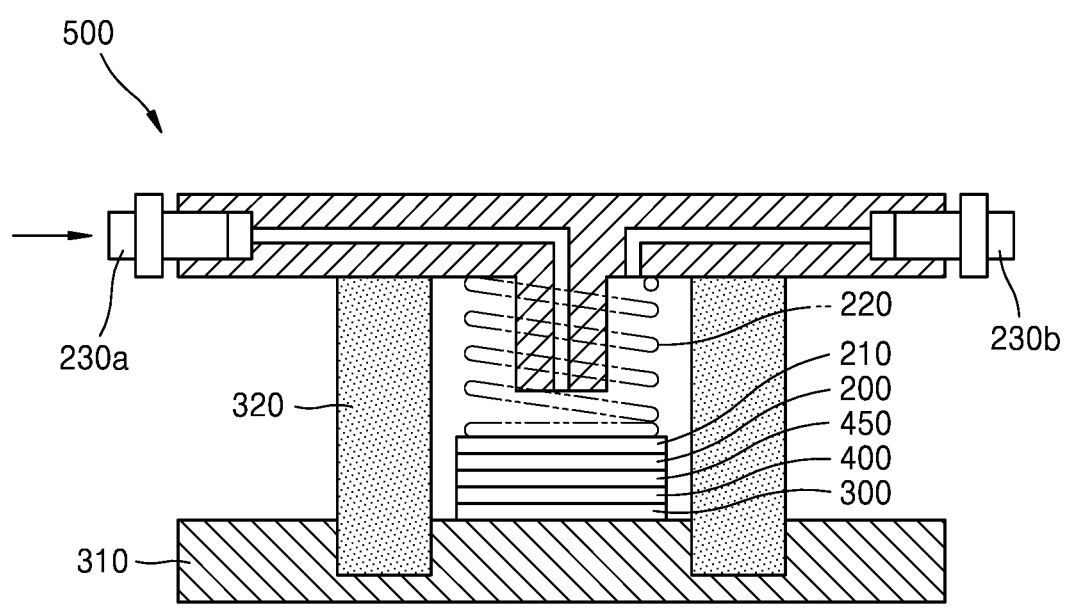
FIG. 5 is a schematic diagram of an embodiment of a lithium-air battery.

An example of the lithium-air battery is schematically illustrated in FIG. 5. A lithium-air battery 500 includes a positive electrode 200 located on a first current collector 210 and configured to use oxygen as an active material, a negative electrode 300 located on a second current collector 310 and including lithium, and a first electrolyte layer 400 interposed therebetween. The first electrolyte layer 400 is a separator impregnated with a liquid electrolyte. A second electrolyte layer 450 is located between the positive electrode 200 and the first electrolyte layer 400. The second electrolyte layer 450 is Li ion-conductive solid electrolyte film. The first current collector 210 that is porous may also serve as a gas diffusion layer allowing diffusion of air. A pressing member 220 allowing air to reach the positive electrode 200 is located on the first current collector 210. A case 320 formed of an insulating resin is interposed between the positive electrode 200 and the negative electrode 300 to electrically insulate the positive electrode 200 from the negative electrode 300. Air is supplied through an air inlet 230*a* and discharged through an air outlet 230*b*. The lithium-air battery 500 may be accommodated in a stainless steel case.

The term "air" of the lithium-air battery is not limited to atmospheric air and may also refer to a combination of gases including oxygen or pure oxygen gas. This broad definition of "air" may also be applied to all applications, such as air batteries and air electrodes.

A method of preparing a mixed conductor according to an embodiment comprises: mixing a precursor of element T, a precursor of element A, and a precursor of element M to prepare a mixture of precursors; and reacting (e.g., heat treating) the mixture, e.g., in a solid phase, to prepare the mixed conductor. In an embodiment, the method of preparing a mixed conductor comprises mixing a precursor of element T, a precursor of element A, and a precursor of element M to prepare a mixture; and heat treating the mixture to prepare the mixed conductor, wherein the mixed conductor is represented by Formula 1:

$$T_xVa_yA_{1-x-y}M_zO_{3-\delta}$$ Formula 1 wherein, in Formula 1, T comprises at least one monovalent cation, A comprises at least one selected from a monovalent cation, a divalent cation, and a trivalent cation, M comprises at least one selected from a trivalent cation, a tetravalent cation, and a pentavalent cation, M is an element other than Ti and Zr, Va is a vacancy, $\delta$ is an oxygen vacancy, $0<x$, $y \leq 0.25$, $0<z \leq 1$, and $0 \leq \delta \leq 1$.

Since the mixed conductor is prepared using a solid phase method, a manufacturing process is simple, cost-effective, and suitable for mass production.

For example, the preparing of the mixed conductor may be performed by mixing the precursor of element T, the precursor of element A, and the precursor of element M in an organic solvent using a ball mill. The organic solvent may be an alcohol such as ethyl alcohol. However, the solvent is not limited thereto, and any suitable solvents used for a ball milling process may be used. The reacting of the mixture in the solid phase refers to carrying out the reaction without a solvent.

The mixed conductor prepared according to the method of preparing a mixed conductor is represented by Formula 1 below.

$$T_xVa_yA_{1-x-y}M_zO_{3-\delta}$$ Formula 1

In Formula 1,
T includes at least one monovalent cation,
A includes at least one of a monovalent cation, a divalent cation, and a trivalent cation,
M includes at least one of a trivalent cation, a tetravalent cation, and a pentavalent cation,
M is an element other than Ti and Zr,
Va is a vacancy,
$\delta$ is an oxygen vacancy,
$0<x$, $y \leq 0.25$, $0<z \leq 1$, and $0 \leq \delta \leq 1$.

For example, the precursor of element T is a salt of T or an oxide or a carbonate of T, the precursor of element A is a salt of A or an oxide or a carbonate of A, and the precursor of element M is a salt of M or an oxide of M.

For example, in the method of preparing the mixed conductor, the precursor of element M may include two or more types of compounds. For example, the precursor of element M may include a precursor of element M' and a precursor of element M".

In this case, the mixed conductor prepared according to the method may be represented by Formula 2 below.

$$T_xVa_yA_{1-x-y}M''_zM'_{1-z}O_{3-\delta}$$ Formula 2

In Formula 2,
T includes at least one monovalent cation,
A includes at least one of a monovalent cation, a divalent cation, and a trivalent cation,
M' and M" each independently include at least one of a trivalent cation, a tetravalent cation, and a pentavalent cation,
M' and M" are each independently an element other than Ti and Zr,
Va is a vacancy,
$\delta$ is an oxygen vacancy,
$0<x$, $y \leq 0.25$, $0<z<1$, and $0 \leq \delta \leq 1$ For example, the precursor of element T is a Li precursor. Examples of the Li precursor include, but are not limited to, $Li_2CO_3$, $LiNO_3$, $LiNO_2$, $LiOH$, $LiOH \cdot H_2O$, $LiH$, $LiF$, $LiCl$, LiBr, LiI, CH$_3$OOLi, Li$_2$O, Li$_2$SO$_4$, lithium dicarboxylate, lithium citrate, lithium fatty acid, and alkyl lithium, and other suitable Li precursors available in the art may also be used. For example, the Li precursor may be lithium carbonate (Li$_2$CO$_3$).

For example, the precursor of element A is a precursor including at least one metal of Na, K, Rb, Cs, Ca, Sr, Ba, Sc, Y, La, Ce, Pr, Nd, Pm, Sm, Gd, Tb, Dy, Ho, Tm, Yb, Lu, Er, and Eu. For example, the precursor of element A may be a La precursor or a Sr precursor. The La precursor may include at least one of an alkoxide, a chloride, an oxide, a hydroxide, a nitrate, a carbonate, and an acetate including lanthanum. For example, the La precursor may be lanthanum oxide (La$_2$O$_3$). The Sr precursor may include at least one of alkoxide, chloride, oxide, hydroxide, nitrate, carbonate, and an acetate including strontium. For example, the Sr precursor may be strontium oxide (SrCO$_3$). The alkoxide may be a C1 to C30 alkoxide, or a C2 to C20 alkoxide, for example.

The reacting step includes one or more heat treatments. For example, the heat treatment may continuously be performed while adjusting temperature in the same vessel a plurality of times. As another example, the heat treatments may be performed by transferring a product of a first heat treatment to a separate vessel and performing a second heat treatment.

According to an embodiment, the reacting step, e.g., heat treating, includes: drying the mixture and subjecting the dried mixture to a first heat treatment in an oxidizing atmosphere to obtain a first heat treatment product; pulverizing the first heat treatment product to obtain powder of the first heat treatment product; drying the powder and subjecting the dried powder to a second heat treatment in an oxidizing atmosphere to obtain a second heat treatment product; pulverizing and pressing the second heat treatment product to obtain a pellet; and subjecting the pellet to a third heat treatment in an oxidizing atmosphere, in a reducing atmosphere, or in both an oxidizing atmosphere and a reducing atmosphere. In an embodiment, the method of preparing a mixed conductor comprises drying the mixture, first heat treating the mixture in an oxidizing atmosphere to obtain a first heat treatment product, pulverizing the first heat treatment product to obtain powdered first heat treatment product, drying the powdered first heat treatment product, second heat treating the dried and powdered first heat treatment product in an oxidizing atmosphere to obtain a second heat treatment product, pulverizing the second heat treatment product, pressing the pulverized second heat treatment product to obtain a pellet, and third heat treating the pellet in an oxidizing atmosphere, in a reducing atmosphere, or in both an oxidizing atmosphere and a reducing atmosphere to prepare the mixed conductor.

Carbon dioxide (CO$_2$) may be removed from a carbonate precursor by the first heat treatment, and a crystalline phase may be formed by subjecting the first heat treatment product obtained therefrom to the second heat treatment. The second heat treatment may be performed at a temperature and for a time sufficient to allow formation of the crystalline phase.

The third heat treatment may be performed a) in the oxidizing atmosphere, b) in the reducing atmosphere, or c) in both the oxidizing atmosphere and the reducing atmosphere selected according to an oxidation state of a metal included in a desired mixed conductor.

The reducing atmosphere is an atmosphere including a reducing gas. Examples of the reducing gas include, but are not limited to, hydrogen (H$_2$), and any other suitable reducing gas available in the art may also be used. The reducing atmosphere may be a mixture of a reducing gas and an inert gas. Examples of the inert gas include, but are not limited to, nitrogen and argon, and any other suitable inert gas available in the art. An amount of the reducing gas contained in the reducing atmosphere may be, for example from about 1 volume percent (vol %) to about 99 vol %, from about 2 vol % to about 50 vol %, or from about 5 vol % to about 20 vol %, based on a total volume of gases. By performing the heat treatment in a reducing atmosphere, oxygen vacancy is introduced into the mixed conductor.

The oxidizing atmosphere is an atmosphere including an oxidizing gas. Examples of the oxidizing gas include, but are not limited to, oxygen or air, and any other suitable oxidizing gas available in the art may also be used. The oxidizing atmosphere may be a mixture of an oxidizing gas and an inert gas. The inert gas used herein may be the same as that used in the reducing atmosphere.

The third heat treatment performed in both the oxidizing atmosphere and the reducing atmosphere refers to third heat treatment including heat treatments sequentially performed in an oxidizing atmosphere and then in a reducing atmosphere. The oxidizing atmosphere and the reducing atmosphere are identical to the above-described a) oxidizing atmosphere and b) reducing atmosphere.

For example, the first heat treatment may be performed at a temperature of about 600° C. to about 1000° C., about 700° C. to about 900° C., about 600° C. to about 800° C., or about 750° C. to about 850° C. The first heat treatment may be performed for about 3 hours to about 5 hours, about 3 hours to about 4.5 hours, about 3 hours to about 4 hours, or 4 hours. The second heat treatment may be performed at a temperature of about 900° C. to about 1500° C., about 900° C. to about 1400° C., about 900° C. to about 1300° C., about 900° C. to about 1250° C., about 900° C. to about 1200° C., or about 1000° C. to about 1500° C. The second heat treatment may be performed for about 4 hours to about 6 hours, about 4 hours to about 5.5 hours, about 4 hours to about 5 hours, or 5 hours. For example, the third heat treatment may be performed at a temperature of about 1000° C. to about 1400° C., about 1000° C. to about 1300° C., about 1000° C. to about 1250° C., or about 1000° C. to about 1200° C. The third heat treatment may be performed for about 10 hours to about 24 hours, about 10 hours to about 24 hours, about 10 hours to about 23 hours, about 10 hours to about 22 hours, about 10 hours to about 21 hours, about 10 hours to about 20 hours, about 10 hours to about 19 hours, about 10 hours to about 18 hours, about 10 hours to about 17 hours, about 10 hours to about 16 hours, about 10 hours to about 15 hours, about 10 hours to about 14 hours, about 10 hours to about 13 hours, about 11 hours to about 24 hours, or about 12 hours to about 24. However, the heat treatment temperature and the heat treatment time are not limited thereto and may be selected to form a desired phase, e.g., a crystalline perovskite phase. When the first heat treatment to the third heat treatment are performed under these conditions, a mixed phase of the prepared mixed conductor is formed and electric conductivity (electrons/ions), as an electrochemical property, is measured using pellets prepared by the third heat treatment.

Hereinafter, an example embodiments of the present disclosure will be described in further detail with reference to the following examples and comparative examples. These examples and comparative examples are not intended to limit the purpose and scope of the one or more example embodiments of the present disclosure.

EXAMPLES

Preparation of Mixed Conductor

Example 1: $Li_{0.23}La_{0.55}Mn_{0.88}Nb_{0.12}O_3$ $Li_2CO_3$ as a Li precursor, $La_2O_3$ as a La precursor, $MnO_2$ as a Mn precursor, and $Nb_2O_5$ as an Nb precursor were mixed in a stoichiometric ratio and mixed with ethanol, and then pulverized and mixed using a ball mill with zirconia balls at 280 revolutions per minute (rpm) for 4 hours to obtain a mixture. The obtained mixture was dried at 90° C. for 6 hours and subjected to a first heat treatment in an air atmosphere at 800° C. for 4 hours. A first heat treatment product was pulverized using a ball mill, and then further pulverized and mixed with ethanol for 4 hours to obtain a mixture. The obtained mixture was dried at 90° C. for 6 hours and subjected to a second heat treatment in an air atmosphere at 1100° C. for 5 hours. A second heat treatment product was pressed by isostatic pressure to prepare pellets. The prepared pellets were subjected to a third heat treatment in an air atmosphere at 1200° C. for 12 hours to prepare a mixed conductor. The prepared mixed conductor had a composition of $Li_{0.23}La_{0.55}Mn_{0.88}Nb_{0.12}O_3$.

Example 2: $Li_{0.23}La_{0.55}Co_{0.88}Nb_{0.12}O_3$

A mixed conductor was prepared in the same manner as in Example 1, except that a Co precursor was used instead of the Mn precursor. The prepared mixed conductor had a composition of $Li_{0.23}La_{0.55}Co_{0.88}Nb_{0.12}O_3$.

Example 3: $Li_{0.23}La_{0.55}Ru_{0.88}Nb_{0.12}O_3$

A mixed conductor was prepared in the same manner as in Example 1, except that a Ru precursor was used instead of the Mn precursor. The prepared mixed conductor had a composition of $Li_{0.23}La_{0.55}Ru_{0.88}Nb_{0.12}O_3$.

Example 4: $Li_{0.23}La_{0.55}Mn_{0.88}Ta_{0.12}O_3$

A mixed conductor was prepared in the same manner as in Example 1, except that a Ta precursor was used instead of the Nb precursor. The prepared mixed conductor had a composition of $Li_{0.23}La_{0.55}Mn_{0.88}Ta_{0.12}O_3$.

Example 5: $Li_{0.23}La_{0.55}Co_{0.88}Ta_{0.12}O_3$

A mixed conductor was prepared in the same manner as in Example 1, except that a Co precursor was used instead of the Mn precursor and a Ta precursor was used instead of the Nb precursor. The prepared mixed conductor had a composition of $Li_{0.23}La_{0.55}Co_{0.88}Ta_{0.12}O_3$.

Example 6: $Li_{0.23}La_{0.55}Ru_{0.88}Ta_{0.12}O_3$

A mixed conductor was prepared in the same manner as in Example 1, except that a Ru precursor was used instead of the Mn precursor and a Ta precursor was used instead of the Nb precursor. The prepared mixed conductor had a composition of $Li_{0.23}La_{0.55}Ru_{0.88}Ta_{0.12}O_3$.

Comparative Example 1: $Li_{0.34}La_{0.55}TiO_3$ $Li_2CO_3$ as a Li precursor, $La_2O_3$ as a La precursor, and $TiO_2$ as a Ti precursor were mixed in a stoichiometric ratio and mixed with ethanol, and then pulverized and mixed using a ball mill with zirconia balls at 280 rpm for 4 hours to obtain a mixture. The obtained mixture was dried at 90° C. for 6 hours and subjected to a first heat treatment in an air atmosphere at 800° C. for 4 hours. A first heat treatment product was pulverized using a ball mill, and then further pulverized and mixed with ethanol for 4 hours to obtain a mixture. The mixture was dried at 90° C. for 6 hours and subjected to a second heat treatment in an air atmosphere at 1100° C. for 5 hours. A second heat treatment product was pressed by isostatic pressure to prepare pellets. The prepared pellets were subjected to a third heat treatment in an air atmosphere at 1200° C. for 12 hours to prepare a conductor.

Comparative Example 2: $Li_{0.34}La_{0.55}ZrO_3$

A conductor was prepared in the same manner as in Comparative Example 1, except that a Zr precursor of $ZrO_2$ was used instead of the Ti precursor.

Evaluation Example 1: Evaluation of Electronic Conductivity

Au was sputtered on opposite surfaces of pellets of each of the mixed conductors and the conductors prepared according to Examples 1 to 6 and Comparative Examples 1 and 2 to prepare an ion blocking cell. Electronic conductivity of the ion blocking cell was measured by a DC polarization method.

Time dependent current obtained when a constant voltage of 100 mV was applied to the prepared symmetric cell was measured. Electronic resistance of the mixed conductor was calculated based on the measured current and electronic conductivity was calculated therefrom. The obtained electronic conductivities are shown in Table 2 below and FIG. 1.

Evaluation Example 2: Evaluation of Ionic Conductivity

A separator layer impregnated with a liquid electrolyte (1 M lithium bis(trifluoromethanesulfonyl)imide (LiTFSI) in propylene carbonate (PC)) was located on opposite surfaces of pellets of each of the mixed conductors and the conductors prepared according to Examples 1 to 6 and Comparative Examples 1 and 2, and a stainless steel stacked with lithium was located on an electrolyte layer as a current collector to complete the manufacture of an electron blocking cell. Ionic conductivity of the electron blocking cell was measured by using a DC polarization method.

Time dependent current obtained when a constant voltage of 100 mV was applied to the prepared symmetric cell for 30 minutes was measured. After calculating ionic resistance of a cell based on the measured current, ionic resistance of the mixed conductor was calculated by subtracting ionic resistance of a solid electrolyte layer from the ionic resistance of the cell, and ionic conductivity was calculated therefrom. The obtained ionic conductivities are shown in Table 2 below and FIG. 1.

TABLE 2

| | Composition | Electronic conductivity | Ionic conductivity |
|---|---|---|---|
| Comparative Example 1 | $Li_{0.34}La_{0.55}TiO_3$ | $3.8 \times 10^{-9}$ S/cm | $1.2 \times 10^{-5}$ S/cm |
| Comparative Example 2 | $Li_{0.34}La_{0.55}ZrO_3$ | $3.8 \times 10^{-9}$ S/cm | $7.31 \times 10^{-7}$ S/cm |
| Example 1 | $Li_{0.23}La_{0.55}Mn_{0.88}Nb_{0.12}O_3$ | $3.68 \times 10^{-4}$ S/cm | $1.42 \times 10^{-6}$ S/cm |
| Example 2 | $Li_{0.23}La_{0.55}Co_{0.88}Nb_{0.12}O_3$ | $8.43 \times 10^{-6}$ S/cm | $3.21 \times 10^{-6}$ S/cm |
| Example 3 | $Li_{0.23}La_{0.55}Mn_{0.88}Ta_{0.12}O_3$ | $2.13 \times 10^{-2}$ S/cm | $6.32 \times 10^{-6}$ S/cm |
| Example 4 | $Li_{0.23}La_{0.55}Ru_{0.88}Nb_{0.12}O_3$ | $1.06 \times 10^{-3}$ S/cm | $2.30 \times 10^{-6}$ S/cm |
| Example 5 | $Li_{0.23}La_{0.55}Co_{0.88}Ta_{0.12}O_3$ | $1.95 \times 10^{-5}$ S/cm | $1.02 \times 10^{-5}$ S/cm |
| Example 6 | $Li_{0.23}La_{0.55}Ru_{0.88}Ta_{0.12}O_3$ | $2.05 \times 10^{-2}$ S/cm | $6.46 \times 10^{-6}$ S/cm |

As shown in Table 2, the mixed conductors prepared according to Examples 1 to 6 had considerably improved electronic conductivity and provided suitable ionic conductivity, as shown by comparison with the conductors according to Comparative Examples 1 and 2.

The electronic conductivity of the mixed conductors according to Examples 1 to 6 was greater than their ionic conductivity.

While the conductors according to Comparative Examples 1 and 2, including the Ti oxide and the Zr oxide, had very low electronic conductivity, the mixed conductors according to Examples 1 to 6, not including a Ti oxide and a Zr oxide, had greater electronic conductivity than Comparative Examples 1 and 2 by $1 \times 10^2$ S/cm or more.

Evaluation Example 3: XRD Analysis

X-ray diffraction (XRD) spectra of the mixed conductors according to Examples 1 to 6, the conductors according to Comparative Examples 1 and 2, and a cubic material according to a reference example were obtained, and the results are shown in FIG. 2. Cu Kα radiation was used to obtain the XRD spectra.

Referring to FIG. 2, the mixed conductors according to Examples 1 to 6 exhibited peaks corresponding to peaks of the XRD spectrum of the reference example, consistent with the mixed conductors according to Examples 1 to 6 being perovskites having a cubic phase. $Li_{0.34}La_{0.55}TiO_3$ prepared according to Comparative Example 1 exhibited a peak at 25.7°±2.5° 2θ, indicating a perovskite structure having an orthorhombic phase. Also, $Li_{0.34}La_{0.55}ZrO_3$ prepared according to Comparative Example 2, exhibited a peak at 28.5°±2.5° 2θ, indicating an oxidative perovskite structure. Thus, it may be confirmed that the materials prepared according to Examples 1 to 6 contained a phase different from those of the materials prepared according to Comparative Examples 1 and 2 based on comparison of the XRD patterns.

Evaluation Example 4: Oxygen Vacancy Formation Energy

Oxygen vacancy formation energy of each of the materials prepared according to Examples 1 to 6 and Comparative Examples 1 and 2 was calculated based on a method of calculating oxygen vacancy formation energy quantum, the details of which are disclosed in Scientific Data 4 (2017) 170153, Antoine A. Emery, Chris Wolverton, "High-throughput DFT calculations of formation energy, stability and oxygen vacancy formation energy of $ABO_3$ perovskites," the content of which is incorporated herein by reference in its entirety. The results are shown in Table 3.

TABLE 3

| | Composition | Oxygen vacancy formation energy (eV/O) |
|---|---|---|
| Comparative Example 1 | $Li_{0.34}La_{0.55}TiO_3$ | 2.98 |
| Comparative Example 2 | $Li_{0.34}La_{0.55}ZrO_3$ | 2.88 |
| Example 1 | $Li_{0.23}La_{0.55}Mn_{0.88}Nb_{0.12}O_3$ | 1.84 |
| Example 2 | $Li_{0.23}La_{0.55}Co_{0.88}Nb_{0.12}O_3$ | 1.5 |
| Example 3 | $Li_{0.23}La_{0.55}Ru_{0.88}Nb_{0.12}O_3$ | 2.03 |
| Example 4 | $Li_{0.23}La_{0.55}Mn_{0.88}Ta_{0.12}O_3$ | 1.9 |
| Example 5 | $Li_{0.23}La_{0.55}Co_{0.88}Ta_{0.12}O_3$ | 1.56 |
| Example 6 | $Li_{0.23}La_{0.55}Ru_{0.88}Ta_{0.12}O_3$ | 2.09 |

Referring to Table 3, it was confirmed that the mixed conductors according to Examples 1 to 6 include transition metals having lower oxygen vacancy formation energy than those of the conductors according to Comparative Examples 1 and 2, and thus electronic conductivity of the mixed conductors according to Examples 1 to 6 was improved.

According to an embodiment, deterioration of the electrochemical device is prevented by using the chemically stable mixed conductor transferring ions and electrons simultaneously.

It should be understood that embodiments described herein should be considered in a descriptive sense only and not for purposes of limitation. Descriptions of features or aspects within each embodiment should be considered as available for other similar features or aspects in other embodiments.

While an embodiment have been described with reference to the figures, it will be understood by those of ordinary skill in the art that various changes in form and details may be made therein without departing from the spirit and scope as defined by the following claims.

What is claimed is:

1. A mixed ionic and electronic conductor represented by Formula 1:

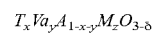

$$T_x Va_y A_{1-x-y} M_z O_{3-\delta} \qquad \text{Formula 1}$$

wherein, in Formula 1,

T comprises at least one monovalent cation,

A comprises at least one of a monovalent cation, a divalent cation, and a trivalent cation, M comprises at least one of a trivalent cation, a tetravalent cation, and a pentavalent cation, and is an element other than Ti and Zr, Va is a vacancy, δ is an oxygen vacancy, $0<x$, $y \leq 0.25$, $0<z \leq 1$, and $0 \leq \delta \leq 1$.

2. The mixed conductor of claim 1, wherein, in Formula 1, T comprises at least one monovalent alkali metal cation.

3. The mixed conductor of claim 1, wherein, in Formula 1, M comprises a first cation and a second cation, and wherein an oxidation state of the first cation is different than an oxidation state of the second cation.

4. The mixed conductor of claim 1, wherein, in Formula 1, M comprises at least one pentavalent cation.

5. The mixed conductor of claim 1, wherein, in Formula 1, T comprises at least one of Li, Na, and K.

6. The mixed conductor of claim 1, wherein, in Formula 1, A comprises at least one of H, Na, K, Rb, Cs, Ca, Sr, Ba, Sc, Y, La, Ce, Pr, Nd, Pm, Sm, Gd, Tb, Dy, Ho, Tm, Yb, Lu, Er, and Eu.

7. The mixed conductor of claim 1, wherein, in Formula 1, M comprises at least one of Ni, Pd, Pb, Fe, Ir, Co, Rh, Mn, Cr, Ru, Re, Sn, V, Ge, W, Sc, Nb, Ta, and Mo.

8. The mixed conductor of claim 1, wherein $0<x<0.3$.

9. The mixed conductor of claim 1, wherein $\delta$ is 0.

10. The mixed conductor of claim 1, wherein the mixed conductor represented by Formula 1 is represented by Formula 2:

$$T_x Va_y A_{1-x-y} M'_z M''_{1-z} O_{3-\delta} \qquad \text{Formula 2}$$

wherein in Formula 2,
T comprises at least one monovalent cation,
A comprises at least one of a monovalent cation, a divalent cation, and a trivalent cation,
M' and M" each independently comprise at least one of a trivalent cation, a tetravalent cation, and a pentavalent cation,
M' and M" are each independently an element other than Ti and Zr,
Va is a vacancy,
$\delta$ is an oxygen vacancy,
$0<x$, $y\leq 0.25$, $0<z<1$, and $0\leq\delta\leq 1$.

11. The mixed conductor of claim 10, wherein M' has an oxygen vacancy formation energy value of 2.9 electron volts, or less.

12. The mixed conductor of claim 10, wherein M' comprises at least one of a trivalent cation and a tetravalent cation, and
M" comprises at least one pentavalent cation.

13. The mixed conductor of claim 1, wherein an electronic conductivity of the mixed conductor is greater than an ionic conductivity of the mixed conductor.

14. The mixed conductor of claim 1, wherein an electronic conductivity of the mixed conductor is $4\times10^{-9}$ S/cm or greater at 25° C.

15. The mixed conductor of claim 1, wherein an ionic conductivity of the mixed conductor is $1\times10^{-6}$ S/cm or greater at 25° C.

16. The mixed conductor of claim 1, wherein the mixed conductor has a phase with a perovskite type crystal structure.

17. The mixed conductor of claim 1, wherein the mixed conductor has a single peak at a diffraction angle of 23°±2.5° two-theta, when analyzed by X-ray diffraction using Cu Kα radiation.

18. An electrochemical device comprising the mixed conductor of claim 1.

19. The electrochemical device of claim 18, wherein the electrochemical device is a battery, an accumulator, a super-capacitor, a fuel cell, a sensor, or an electrochromic device.

* * * * *